United States Patent Office 3,677,780
Patented July 18, 1972

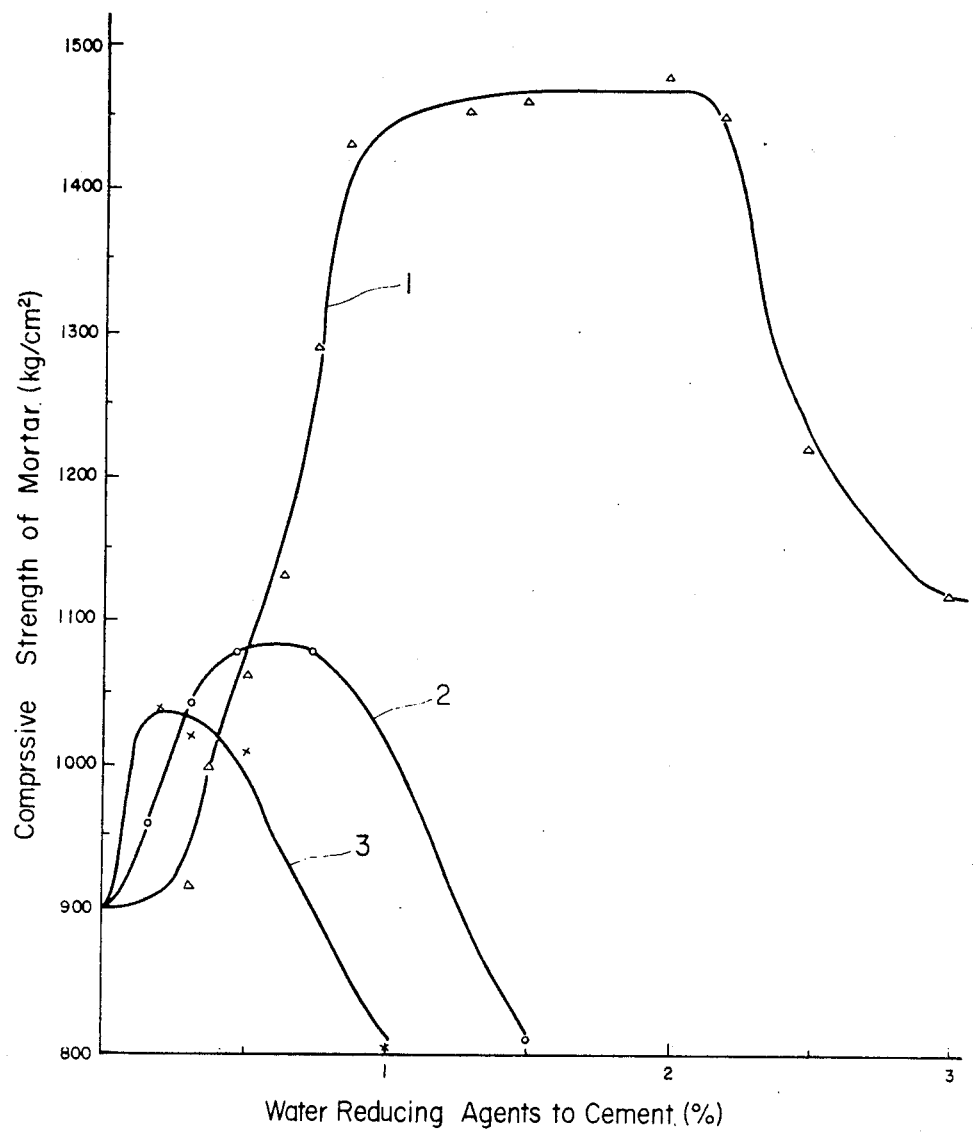

3,677,780
METHOD OF PRODUCING HIGH STRENGTH MORTAR OR CONCRETE
Seiya Nishi, Akira Oshio, and Eto Kiyomitsu, Tokyo, Japan, assignors to Onoda Cement Company Limited, Oaza Onoda, Onoda-shi, Yamaguchi, Japan
Filed Aug. 27, 1970, Ser. No. 67,314
Claims priority, application Japan, Aug. 29, 1969, 44/68,004
Int. Cl. C04b 13/28
U.S. Cl. 106—90                                6 Claims

ABSTRACT OF THE DISCLOSURE

This invention relates to a method of producing high strength mortars or concretes. The process is characterized by curing mortars or concretes incorporated with a salt of β-naphthalenesulphonic acid-formaldehyde condensate in an autoclave.

---

This invention relates to a method of producing high strength mortar or concrete by subjecting shaped articles of mortar or concrete to curing in an autoclave and, more particularly, to a method of producing mortar or concrete products which have high strength by subjecting to autoclave curing shaped articles of mortar or concrete incorporating therein a salt of β-naphthalenesulphonic acid-formaldehyde condensate as represented by the formula

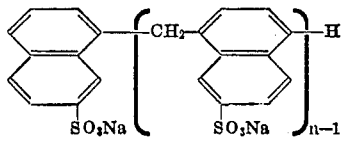

wherein $n$ is a number greater than 2.

Recently, as the manufacture of concrete products becomes prosperous, the demand for a process for shortening the production time has swollen. At present, the shortening of the production time is attained exclusively by subjecting mortar or concrete to curing in an autoclave and in this process mortar or concrete is cured in usual for 9 to 20 hours in an autoclave to obtain a cured product having strength comparable with that of mortar or concrete product which has been subjected to curing in water for at least 28 days in a usual manner.

It is an object of the present invention to shorten the time required for a sufficient curing of mortar or concrete to impart it high strength.

Another object of the present invention is to increase the economical value of mortar or concrete products by further shortening in production time and, consequently, make it possible to develop a novel product.

Thereupon, for attaining these objects, we made various tests on the autoclave curing process for mortar or concrete which was incorporated with various water reducing agents. The term "water reducing agent" so far as used in this specification means an agent which, when added to mortar or concrete, makes it possible to reduce the amount of water required.

The representatives of the results of the tests are indicated in the following tables and accompanying drawings.

In the tests, normal portland cement and sand were mixed in the weight ratio of 1:2 and the mixture was added with an aqueous solution of either one of the three water reducing agents, i.e. a sodium salt of β-naphthalene-sulphonic acid (β-NS)-formaldehyde condensate containing at least 5 β-NS units in a molecule, Maginon 100 supplied by Sugai Chemical Industry Co., Ltd. (the main component of which is a calcium alkylarylsulphonate) and Pozzolith No. 5L supplied by Nisso-Masterbuilders Co., Ltd. (the main component of which is calcium ligninsulphonate), in an amount as to provide mortar of flow value of 160 to 180 mm. The mortar was mixed in the manner in accordance with JIS R 5201–1964 for test of the strength of cement, cast into a frame of 4 x 4 x 16 cm. and, after 3 days, the mortar was taken out of the frame to obtain a test piece. The aggregate used was a sand from the Kinu-gawa river having maximum grain size of 5 mm. (FM=2.72). The test piece was put in an autoclave and was heated over 5 hours to 183° C. (corresponding to a saturated water vapor pressure of 10 atmospheres), maintained under these temperature and pressure conditions for 5 hours for effecting curing and then cooled over 5 hours to room temperature. The test piece was then taken out of the autoclave and subjected to a strength test. The results of the tests were summarized in the Table 1 and FIG. 1. In the FIG. 1, the curve 1, 2 and 3 are respectively of a test piece made out of a mortar incorporated with a sodium salt of β-NS-formaldehyde condensate, Maginon 100 or Pozzolith No. 5L.

TABLE 1

| Water reducing agent | Amount added (percent) | Flow (mm.) | Water/cement ratios (percent) | Bending strength (kg./cm.²) | Compressive strength (kg./cm.²) | Relative compressive strength | Remarks |
|---|---|---|---|---|---|---|---|
|  | 0.00 | 169 | 37.3 | 170 | 900 | 100 |  |
|  | 0.25 | 168 | 37.7 | 163 | 911 | 101 |  |
|  | 0.375 | 167 | 36.3 | 169 | 1000 | 111 |  |
|  | 0.50 | 178 | 34.3 | 182 | 1062 | 118 |  |
|  | 0.625 | 171 | 33.0 | 209 | 1132 | 126 |  |
|  | 0.75 | 162 | 32.2 | 191 | 1390 | 154 |  |
| Sodium salt of β-NS-formaldehyde condensate | 0.875 | 178 | 31.3 | 192 | 1430 | 159 |  |
|  | 1.25 | 180 | 28.0 | 203 | 1450 | 161 |  |
|  | 1.5 | 171 | 27.0 | 199 | 1456 | 162 |  |
|  | 2.0 | 183 | 27.7 | 208 | 1479 | 165 |  |
|  | 2.2 | 173 | 27.9 | 200 | 1440 | 160 |  |
|  | 2.5 | 178 | 28.0 | 189 | 1220 | 136 |  |
|  | 3.0 | 186 | 28.3 | 175 | 1118 | 125 |  |
|  | 4.0 | 176 | 28.3 | 166 | 1143 | 127 |  |
| Maginon 100 | 0.15 | 157 | 37.6 | 172 | 954 | 106 |  |
|  | 0.30 | 153 | 34.5 | 183 | 1040 | 116 |  |
|  | 0.45 | 158 | 33.4 | 189 | 1080 | 120 |  |
|  | 0.75 | 170 | 32.0 | 195 | 1080 | 120 | ⎱ Viscosity of mortar increased in the step of mixing. |
|  | 1.50 | 188 | 29.8 | 153 | 810 | 90 | ⎰ |
| Pozzolith No 5L | 0.20 | 162 | 35.3 | 204 | 1040 | 116 |  |
|  | 0.30 | 157 | 34.8 | 200 | 1020 | 113 |  |
|  | 0.50 | 159 | 35.7 | 200 | 1010 | 112 | ⎱ Mortar stiffened in the step of mixing. |
|  | 1.00 | 159 | 40.0 | 150 | 800 | 88.8 | ⎰ |

As indicated by the Table 1 and FIG. 1, in case where a sodium salt of β-NS-formaldehyde condensate contains at least 5 β-NS units in molecule, the compressive strength of the mortar abruptly increased in proportion to the amount of the agent added until the amount of 0.75% and took the maximum value of 1400 to 1480 kg./cm.$^2$ at the amount added within the range of from 0.75% to 2.3%, and then decreased at the amount of over 2.3%. The maximum compression strength is 55 to 65% higher than that of plain mortar. On the contrary, in cases of Maginon 100 and Pozzolith No. 5L, the compression strength of mortar incorporated with one of them also increased in proportion to the amount added, but the maximum value was about 1070 kg./cm.$^2$, at the amounts added of 0.45 to 0.75% in case of Maginon 100 and about 1040 kg./cm.$^2$ at the amounts added of 0.2 to 0.5% in case of Pozzolith No. 5L. These values are by far smaller than the value of the maximum compressive strength obtained by incorporation of the sodium salt of β-NS-formaldehyde condensate, and the range of the amount added necessary for obtaining the maximum compressive strength is considerably narrow compared with that in case of the sodium salt of β-NS-formaldehyde condensate.

Next, a gravel from the Abe-kawa river having maximum grain size of 20 mm. as a coarse aggregate, a sand from the Kinu-gawa river as a fine aggregate and normal or moderate heat portland cement were mixed in the proportions as listed in the Table 2 and the mixture was added with water and a sodium salt of β-NS-formaldehyde condensate containing at least 5 β-NS units in a molecule, in the amounts as listed in the Table 2, mixed and cast in a cylindrical frame having a diameter of 10 cm. and a height of 20 cm. and after 24 hours, the concrete thus formed was taken out of the frame, heated over 8 hours to 183° C. (saturated steam pressure of 10 atmospheres), maintained at this temperature for 5 hours and then cooled over 8 hours to room temperature. The compressive strengths of the products thus obtained were as shown in the Table 2.

As indicated by the Table 2, the addition of the sodium salt of β-NS-formaldehyde condensate to concrete resulted in increase in compressive strength of the concrete within a certain range of amount added as in the case of mortars.

TABLE 2

| Cement | Normal portland cement | | | | Moderate heat portland cement | |
|---|---|---|---|---|---|---|
| Amounts added of sodium salt of β-NS-formaldehyde condensate (percent) | 0 | 0.75 | 1.25 | 2.6 | 0 | 0.75 |
| Amounts of cement per unit volume (kg./m.$^3$) | 480 | 480 | 480 | 480 | 480 | 480 |
| Amounts of water per unit volume (kg./m.$^3$) | 173 | 141 | 130 | 131 | 175 | 135 |
| Water-cement ratios (percent) | 36.3 | 29.4 | 27.0 | 27.4 | 36.5 | 28.2 |
| Sand percentage (percent) | 43 | 41 | 41 | 41 | 43 | 41 |
| Amounts of aggregates per unit volume (kg./m.$^3$): | | | | | | |
| 25-5 mm | 1,035 | 1,100 | 1,117 | 1,116 | 1,034 | 1,111 |
| Under 5 mm | 779 | 760 | 772 | 771 | 778 | 773 |
| Slump (cm.) | 6.5 | 6.0 | 7.0 | 8.0 | 6.0 | 7.0 |
| Compressive strength (kg.cm.$^2$) | 700 | 1,080 | 1,150 | 920 | 637 | 991 |
| Relative compressive strength | 100 | 155 | 164 | 132 | 100 | 156 |

Although it was ascertained by the above tests that the sodium salt of β-NS-formaldehyde condensate was one of the most effective water reducing agents, the following tests were made for the sake of ascertaining that the increase in compression strength was caused under high pressure steam curing or by decrease in water/cement ratio.

To the cement and sand mixture as used in the above tests there were added water and the sodium salt of β-NS-formaldehyde condensate as used in the above tests, in various proportions as listed in the Table 3, and the resulting mortars were molded under the same conditions as mentioned above into test pieces. The test pieces were, after curing in water at 20±1° C. for 7 days, subjected to measurement of compressive strength. The results obtained were summarized in the Table 3.

TABLE 3

| Water reducing agent | Sodium salt of β-NS-formaldehyde condensate | | | | |
|---|---|---|---|---|---|
| Amounts added (percent) | 0 | 0.5 | 1.0 | 2.0 | 3.0 |
| Flow (mm.) | 160 | 176 | 180 | 184 | 175 |
| Water/cement ratio (percent) | 37.2 | 34.3 | 30.3 | 28.3 | 29.5 |
| Compressive strength of mortar (kg./cm.$^2$) | 618 | 668 | 780 | 767 | 673 |
| Relative compressive strength | 100 | 108 | 125 | 124 | 109 |

The above results indicate that, in case of mortars which have been cured in water under atmospheric pressure, the sodium salt of β-NS-formaldehyde condensate gave a maximum compressive strength of 760 to 780 kg./cm.$^2$ at the amounts added of 1.0 to 2.0%, but the increase in maximum compressive strength compared with the maximum compressive strength of a plain mortar is only 25%. On the other hand, the cement and sand mixture of the same composition as mentioned above was added with water alone in variable water/cement ratios and the resulting mortars were molded into test pieces under the same conditions as mentioned above. The test pieces were then cured in an autoclave under the same conditions as mentioned above and subjected to measurement of compressive strength. The results obtained were as listed in the Table 4.

TABLE 4

| Water reducing agent | Water/cement ratio | Compressive strength (kg./cm.$^2$) | Relative compressive strength |
|---|---|---|---|
| None | 37.0 | 900 | 100 |
| | 35.0 | 910 | 101 |
| | 32.0 | 955 | 106 |
| | 29.0 | 981 | 109 |

As understood from the above results, as the water/cement ratio decreased the compressive strength of mortar became higher, but the compressive strength of mortar prepared by using no water reducing agent is by far lower than that of mortar of the same water/cement ratio as listed in the Table 1 which was prepared using a sodium salt of β-NS-formaldehyde condensate.

Therefore, it is believed that the increase in compressive strength of mortar as indicated by the Table 1 and FIG. 1 resulting from the addition of the sodium salt of β-NS-formaldehyde condensate is caused by certain special interaction between the sodium salt of β-NS-formaldehyde condensate and cement during curing in autoclave. Such results would never take place between any other water reducing agents and cement.

The present invention is applicable not only to concretes and mortars of normal portland cement but also to those of moderate heat portland cement, high-early-strength portland cement, blast furnace cement, silica cement, fly ash cement or the like.

The present invention has been accomplished on the basis of the above discoveries and the method of the present invention comprises subjecting mortar or concrete incorporated with 0.5 to 3.0%, based on the weight of cement, of a salt of β-NS-formaldehyde condensate containing at least 5 β-NS units per molecule to a curing in an autoclave.

As the β-NS-formaldehyde condensate preferably used in the present invention are those containing at least 70% of condensation polymers having 5 to 10 β-NS units in a molecule, and the condensate may be added in an amount of 0.5 to 3.0%, preferably 0.75 to 2.3% by weight of cement calculated as 5 to 10 units condensate. The salt preferably used includes sodium salt, calcium salt and mixtures thereof. The curing of mortar or concrete in autoclave preferably is conducted under a pressure of at least 2 kg./cm.$^2$. The necessary curing time becomes shorter as the pressure is raised. However, a too high pressure is disadvantageous from an economical stand of view and it is preferred to conduct the curing under a pressure of about 10 kg./cm.$^2$. The curing time varies depending on the vapor pressure and the compressive strength required for the product.

Thus, according to the present invention it is possible to shorten the time required for curing in autoclave and, accordingly, the whole working time.

EXAMPLE

Normal portland cement and sand from the Kinu-gawa river (maximum grain size 5 mm., FM=2.72) were mixed in the weight ratio of 1:2. The mixture was added with water in the amount as to provide a water/cement ratio of 27% and with 0.9%, based on the weight of cement, of a sodium salt of a $\beta$-NS-Formalin condensate (containing 5 to 10 $\beta$-NS units in molecule) and mixed in a mixer for 2 minutes to obtain a mortar of a flow value of 170 mm. The mortar was immediately cast in a frame of 4 x 4 x 16 cm. and, after curing at 20° C. for 24 hours in a moist chamber at relative humidity of 95%, taken out of the frame. The molded mortar was put in an autoclave and the autoclave was heated to 183° C. (10 atmospheres) over 2 hours, maintained at the temperature for 4 hours and then cooled and released from pressure over 2 hours. The compressive strength of mortar product thus obtained was 1390 kg./cm.$^2$.

What is claimed is:

1. A method of producing high strength cementitious mortar or concrete of which cement is selected from the group consisting of normal portland cement, moderate heat portland cement, high-early strength portland cement, blast furnace cement, silica cement, and fly ash cement including the step of curing the material in an autoclave, the improvement comprising adding from about 0.5 to 3.0 percent by weight of cement a salt of $\beta$-naphthalenesulphonic acid-formaldehyde condensate to said mortar or concrete prior to curing.

2. A method claimed in claim 1 in which the salt of $\beta$-naphthalenesulphonic acid-formaldehyde condensate consists of at least 70% of condensation polymers having at least 5 $\beta$-naphthalenesulphonic acid units in a molecule.

3. A method claimed in claim 1 in which at least one member selected from the group consisting of sodium and calcium salts of $\beta$-naphthalenesulphonic acid-formaldehyde condensates is used.

4. A method claimed in claim 1 in which the salt of $\beta$-naphthalenesulphonic acid-formaldehyde condensate is used in an amount of 0.75 to 2.3% by weight of cement.

5. A method claimed in claim 1 in which the salt of $\beta$-naphthalenesulphonic acid-formaldehyde condensate having 5 to 10 $\beta$-naphthalenesulphonic acid units in a molecule is used in an amount of 0.75 to 2.3% by weight of cement.

6. A method claimed in claim 1 in which mortar or concrete is cured in steam under a pressure of 2 to 10 kg./cm.$^2$ in an autoclave.

References Cited

UNITED STATES PATENTS

| | | | |
|---|---|---|---|
| 3,465,825 | 9/1969 | Hook et al. | 106—90 |
| 3,277,162 | 10/1966 | Johnson | 106—90 |
| 2,690,975 | 10/1954 | Scripture | 106—315 |
| 2,499,445 | 3/1950 | Ammann | 106—315 |
| 2,141,571 | 12/1938 | Kennedy et al. | 106—90 |
| 2,141,569 | 12/1938 | Tucker | 106—90 |
| 1,972,208 | 9/1934 | Tucker | 106—90 |

OTHER REFERENCES

Lea and Desch, "The Chemistry of Cement and Concrete," Edw. Arnold & Sons, pp. 342–346 (1956).

Taylor, W. H., "Concrete Technology and Practice," American Elsevier, pp. 175–176 (1965).

TOBIAS E. LEVOW, Primary Examiner

W. T. SCOTT, Assistant Examiner

U.S. Cl. X.R.

106—314